United States Patent
Kang et al.

(10) Patent No.: US 8,782,798 B2
(45) Date of Patent: Jul. 15, 2014

(54) METHOD AND APPARATUS FOR PROTECTING DATA USING A VIRTUAL ENVIRONMENT

(75) Inventors: Kyung Wan Kang, Seoul (KR); Kwang Tae Kim, Seoul (KR); Heean Park, Seoul (KR)

(73) Assignee: Ahnlab, Inc., Gyeonggi-Do (KR)

( * ) Notice: Subject to any disclaimer, the term of this patent is extended or adjusted under 35 U.S.C. 154(b) by 0 days.

(21) Appl. No.: 13/389,883

(22) PCT Filed: Aug. 10, 2010

(86) PCT No.: PCT/KR2010/005215
§ 371 (c)(1),
(2), (4) Date: Feb. 10, 2012

(87) PCT Pub. No.: WO2011/019177
PCT Pub. Date: Feb. 17, 2011

(65) Prior Publication Data
US 2012/0144500 A1    Jun. 7, 2012

(30) Foreign Application Priority Data
Aug. 11, 2009    (KR) .................. 10-2009-0073831

(51) Int. Cl.
*G06F 21/00*    (2013.01)
*H04L 29/06*    (2006.01)
*G06F 21/53*    (2013.01)
*G06F 9/455*    (2006.01)

(52) U.S. Cl.
CPC ........ *H04L 63/1416* (2013.01); *H04L 63/1408* (2013.01); *G06F 21/53* (2013.01); *G06F 2009/45587* (2013.01)

USPC .................................. 726/26; 714/6.2; 718/1

(58) Field of Classification Search
CPC .......... G06F 21/53; G06F 2009/45587; H04L 63/1416; H04L 63/1408
USPC ......................................... 726/4, 26; 365/195
See application file for complete search history.

(56) References Cited

U.S. PATENT DOCUMENTS

| 5,555,385 A | 9/1996 | Osisek |
| 6,553,466 B1 | 4/2003 | Friedman et al. |

(Continued)

FOREIGN PATENT DOCUMENTS

| KR | 1020010109271 | 12/2001 |
| KR | 1020050085015 | 8/2005 |
| KR | 1020070049885 | 5/2007 |
| WO | 2005036405 | 4/2005 |

OTHER PUBLICATIONS

Firley, "An Overview of Virtual Machine Security Features", May 31, 1987, p. 1-177.*

*Primary Examiner* — Thanhnga B Truong
*Assistant Examiner* — Gregory Lane
(74) *Attorney, Agent, or Firm* — Bacon & Thomas, PLLC

(57) ABSTRACT

The present invention relates to a method and apparatus for protecting data using a virtual environment, which creates a safe virtual environment that supports the execution of application programs being operated on a computer and which enables important data to be inputted or outputted only within the virtual environment, such that access to the important data is prevented in a general local environment. According to the present invention, data leakage is initially prevented to protect data, and convenience is provided in that a user may use the computer in a general manner while performing desired work.

19 Claims, 3 Drawing Sheets

(56) References Cited

U.S. PATENT DOCUMENTS

| | | | |
|---|---|---|---|
| 6,725,289 B1 | 4/2004 | Waldspurger et al. | |
| 7,117,284 B2 | 10/2006 | Watt et al. | |
| 7,228,434 B2* | 6/2007 | Zisowski | 713/187 |
| 8,391,494 B1* | 3/2013 | Serenyi | 380/278 |
| 2002/0169987 A1* | 11/2002 | Meushaw et al. | 713/201 |
| 2007/0050849 A1* | 3/2007 | Takashima | 726/26 |
| 2007/0067435 A1 | 3/2007 | Landis et al. | |
| 2007/0103997 A1* | 5/2007 | Bennett et al. | 365/195 |
| 2008/0072000 A1 | 3/2008 | Osaki et al. | |
| 2008/0184225 A1* | 7/2008 | Fitzgerald et al. | 718/1 |
| 2008/0184226 A1* | 7/2008 | Ota | 718/1 |
| 2009/0119538 A1* | 5/2009 | Scales et al. | 714/6 |
| 2009/0307686 A1* | 12/2009 | Hepkin | 718/1 |
| 2010/0115332 A1* | 5/2010 | Zheng et al. | 714/6 |
| 2010/0199351 A1* | 8/2010 | Protas | 726/25 |

\* cited by examiner

METHOD AND APPARATUS FOR PROTECTING DATA USING A VIRTUAL ENVIRONMENT

FIELD OF THE INVENTION

The present invention relates to data protection using a virtual environment, and more particularly, to a data protection method and apparatus using a virtual environment which are capable of protecting data against a data leakage incident by processing a data input or output within a virtual environment that supports execution of an application program operated in a computer.

BACKGROUND OF THE INVENTION

As well-known in the art, due to negative influence of the prevalence of computers and the Internet, the possibility of leakage of secret data of enterprises or clients' personal information is on the rise, and substantially, a corresponding financial loss tends to grow annually. Particularly, data managed in enterprises is leaked by insiders in many cases, and it has become a social issue in addition to the problem of the enterprises themselves because such an internal data leakage involves client's personal information, as well as secret data of enterprises.

Conventionally, in order to prevent such a data leakage, techniques for monitoring data leakage points and preventing data from being transmitted from a computer to an external device or a different computer via the leakage points in a network have been used. However, in line with the acceleration of the development of information communication technologies, various types of external devices have been presented, and leakage points have also been diversified. Therefore, blocking leakage points for preventing a data leakage and protection has a limitation.

In particular, when an insider intends to leak data created by him self or corrected in his computer, it would be very difficult to prevent a data leakage.

[Patent document 1] U.S. Patent Publication No. 2008-0072000

SUMMARY OF THE INVENTION

In view of the above, the present invention provides protecting data from a leakage incident by processing an input or output operation within a virtual environment capable of supporting execution of an application program operated in a computer with respect to data generated during a particular process to prevent the corresponding data from being taken out to a local environment of a computer without an authorization.

In accordance with an aspect of the present invention, there is provided a data protection method using a virtual environment including: constructing a virtual environment that supports execution of an application program operated in a computer; when a process generated by the application program corresponds with a preset condition, driving the process within the virtual environment; and processing a data input request or output request generated in the driven process within the virtual environment. Herein, said constructing a virtual environment includes generating a virtual data storage unit within the virtual environment the virtual data storage unit being accessible by a process driven within the virtual environment but not being accessible by a process driven outside the virtual environment.

The virtual data storage unit may include at least any one of a virtual image file existing in a local disk of the computer, an external storage device connected to the computer, a file server connected to the computer through a network, a web hard accessible by the computer, and a file transfer protocol (FTP) host accessible by the computer.

Said driving the process may include: monitoring generation of the process; determining whether the process is allowed to access the virtual environment based on a result obtained by comparing the monitored process and the preset condition; and when the process is determined to be allowed to access the virtual environment, driving the process within the virtual environment, and when the process is determined not to be allowed to access the virtual environment, driving the process outside the virtual environment.

The data input request or output request may be processed by using the virtual data storage unit.

When status information of the local disk is displayed, the virtual data storage unit is mapped to the local disk to display the status information of the local disk by merging the same with status information of the virtual data storage unit.

In response to the output request, the data is preferably subjected to an encryption process based on a predefined security rule and then stored in the virtual data storage unit.

Further, in response to the input request, the data is preferably subjected to a decryption process based on a predefined security rule and then read from the virtual data storage unit.

The method may further includes: when there is a data transmission request for transmitting data from the virtual environment to a local environment, encrypting the data based on a predefined security rule and storing the encrypted data in a local disk of the local environment.

The method may further includes: when there is a data fetch request for fetching data from the local environment to the virtual environment, decrypting the data based on a predefined security rule and reading the decrypted data.

In accordance with another aspect of the present invention, there is provided a data protection apparatus using a virtual environment including: a process monitoring unit for monitoring a process generated by an application program operated in a computer; a virtualization driving unit for constructing a virtual environment that supports execution of the application program, and, when the process corresponds with a preset condition, driving the process within the virtual environment; and a data processing unit for processing a data input request or output request, which is generated in the process driven in the virtual environment, within the virtual environment.

The virtualization driving unit may generate a virtual data storage unit, which is accessible by a process driven within the virtual environment but is not accessible by a process driven outside the virtual environment, within the virtual environment.

The virtual data storage unit may include at least any one of a virtual image file existing in a local disk of the computer, an external storage device connected to the computer, a file server connected to the computer through a network, a web hard accessible by the computer, and a file transfer protocol (FTP) host accessible by the computer.

The virtualization driving unit may generate a virtualization component for supporting execution of the application program in the virtual environment.

The data processing unit may process the data input request or output request by using the virtual data storage unit.

When status information of the local disk is displayed, the data processing unit may map the virtual data storage unit to the local disk to display the status information of the local disk by merging the same with status information of the virtual data storage unit.

In response to the output request, the data is preferably subjected to an encryption process based on a predefined security rule and then stored in the virtual data storage unit.

Further, in response to the input request, the data is preferably subjected to a decryption process based on a predefined security rule and then read from the virtual data storage unit.

When there is a data transmission request for transmitting data from the virtual environment to a local environment, the data processing unit may encrypt the data based on a predefined security rule and stores the encrypted data in a local disk of the local environment.

When there is a data fetch request for fetching data from the local environment to the virtual environment, the data processing unit may decrypt the data based on a predefined security rule and reads the decrypted data.

In accordance with the aspects of the present invention, a stable virtual environment that can support execution of an application program operated in a computer is created, and important data is input or output only within the virtual environment and not allowed to be accessed from outside of the virtual environment, namely, from the local environment, whereby a leakage of the corresponding data can be fundamentally prevented and protected, while providing user convenience that the user can perform a desired operation with the computer in a similar manner to that of the general usage.

DETAILED DESCRIPTION OF THE EMBODIMENTS

Figure 1:
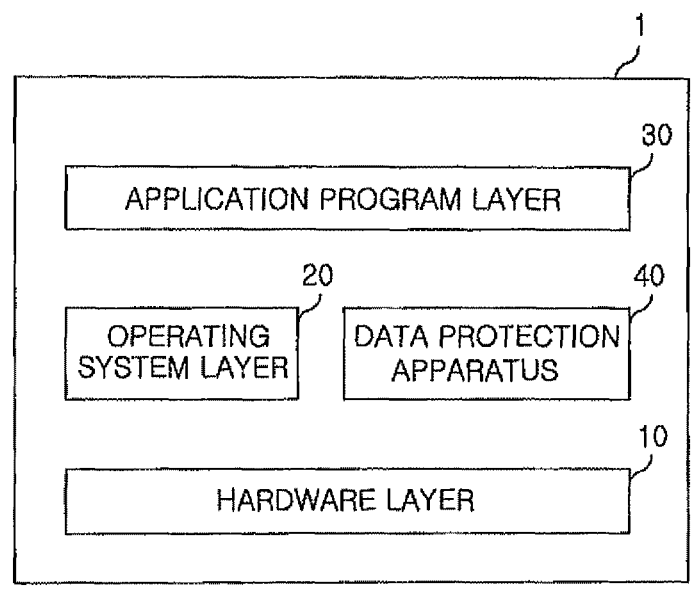
FIG. 1 shows a block diagram of an exemplary computer appropriate to operate a data protection apparatus using a virtual environment in accordance with an embodiment of the present invention.

The advantages and features of the present invention, and methods of accomplishing these will be clearly understood from the following embodiments taken in conjunction with the accompanying drawings. However, the present invention is not limited to those embodiments but may be implemented in various forms. It should be noted that the present embodiments are provided to make a full disclosure of the invention and also to allow those skilled in the art to know the full range of the invention. Therefore, the present invention is to be defined only by the scope of the appended claims. Further, like reference numerals refer to like elements throughout the specification.

FIG. 1 is a block diagram of an exemplary computer appropriate to operate a data protection apparatus in a virtual environment in accordance with an embodiment of the present invention.

As shown in FIG. 1, a computer 1 includes a hardware layer 10, an operating system layer 20, an application program layer 30, a data protection apparatus 40 and the like.

The hardware layer 10 has a processor, a memory, large capacity storage medium (such as a hard disk drive, an optical disk drive or the like), a graphic display subsystem and the like.

The operating layer 20 has an operating system that supports an application program in the application program layer 30. In the operating system, a user preferred environment and the application program in the application program layer 30 and the like may be set.

The application program layer 30 has an application program, a support file, user created data and the like. The application program may be configured with various components of a code module, a text module, a data file, a resource, a configuration file or the like. The user created data may refer to a data file resulted from a use of the application program.

The data protection apparatus 40 constructs a virtual environment that supports execution of an application program operated in the computer 1 and drives a process corresponding with a preset condition among processes executed by the application program within the virtual environment. Further, the data protection apparatus 40 selectively processes a request for inputting or outputting data generated during the execution of a process within the virtual environment to block a leakage of corresponding data without permission, thus protecting the corresponding data. The data protection apparatus 40 may be mounted on the computer 1 as illustrated in FIG. 1, or installed outside the computer 1 and connected to the computer 1 via a communication interface supporting interworking therebetween.

The virtual environment refers to resources that may be required or used for a process executed in the operating system. The virtual environment may include various types of hardware such as a file, a registry, a memory and the like, and various computing environments such as a network or the like. That is, the foregoing various computing environments actually exist, but an environment, which is the same as or similar to the actual computing environment, is virtually created as if it exists.

Figure 2:
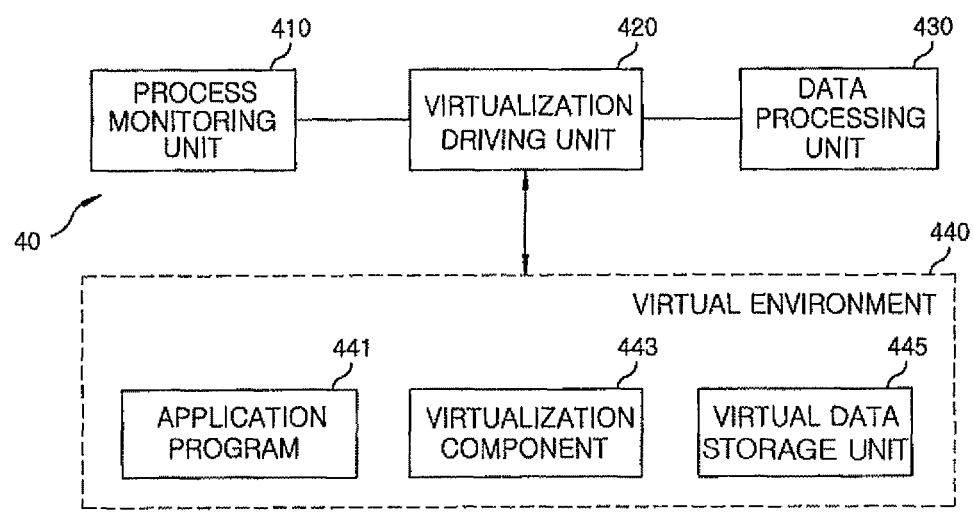
FIG. 2 illustrates a block diagram of the data protection apparatus in accordance with the embodiment of the present invention.

FIG. 2 illustrates a block diagram of the data protection apparatus 40 in accordance with the embodiment of the present invention.

As illustrate in FIG. 2, the data protection apparatus 40 includes a process monitoring unit 410, a virtualization driving unit 420, a data processing unit 430 and the like.

The process monitoring unit 410 monitors a process generated by an application program operated in the computer 1. That is, the process monitoring unit 410 monitors generation of a process by execution of an application program.

The virtualization driving unit 420 constructs a virtual environment 440 that supports execution of an application program 441 and drives a process corresponding with the preset condition among processes monitored by the process monitoring unit 410 within the virtualization environment 440. The preset condition refers to identification information of a process to be monitored for data protection or identification information of an application program. Identification information of a process generated by execution of the application program and the identification information set in the preset condition are compared. Based on the comparison result, whether or not the process or the application program is included in the target to be monitored may be determined. Such a determination may be performed by the process monitoring unit 410 or the virtualization driving unit 420.

In addition, the virtualization driving unit 420 generates, in the virtualization environment 440, a virtual data storage unit 445, which can be accessed by a process driven within the virtual environment 440 but cannot be accessed by a process driven outside the virtual environment 440. As the virtual data storage unit 445, at least one of a virtual image file existing in a local disk of the computer, an external storage device connected to the computer, a file server connected to the computer through a network, a web hard accessible by the computer, and an FTP host accessible by the computer may be used.

Further, the virtualization driving unit 420 generates a virtualization component 443 in the virtual environment 440 in order to support execution of the application program 441 within the virtualization environment 440.

The data processing unit 430 performs an input request or an output request, which is generated in the process executed within the virtualization environment 440 to be internally processed, within the virtual environment 440. For example, the data processing unit 430 stores data in the virtual data storage unit 445 in the virtual environment 440 or reads required data from the virtual data storage unit 445.

Herein, when storing data in the virtual data storage unit 445, the data processing unit 430 performs encryption on the data based on a predefined security rule and stores the same, and when reading data from the virtual data storage unit 445, the data processing unit 430 performs decryption on the data based on the predefined security rule and reads the same. Further, when displaying status information of a local disk by mapping the virtual data storage unit 445 to the local disk actually existing in a local environment, the data processing unit 430 displays the status information of the local disk by merging it with that of the virtual data storage unit 445.

Additionally, in order to transmit and receive data to and from a different virtual environment, the data processing unit 430 may provide a data transmission function for allowing data of the virtual environment 440 to be stored in a local disk of the local environment and a data fetch function for fetching data of the local environment to the virtual environment. Through the data transmission function, data is stored in the local disk and the stored data is transferred to a different virtual environment to be used therein. Also, data transferred from a different virtual environment and stored in the local disk is used in the virtual environment 440 through the data fetch function.

When the data transmission or data fetch is requested, status information of the local disk actually existing in the local environment may be provided. When data is transmitted to the local disk, namely, when the data is stored in the local disk, the data may be encrypted based on the predefined security rule to be stored, and when the data is fetched from the local disk, namely, when the data is read from the local disk, the encrypted data may be decrypted based on the predefined security rule to be read.

A process of processing and protecting data by the data protection apparatus 40 using a virtual environment in accordance with the embodiment of the present invention is now described with reference to FIGS. 3 and 4.

First, an overall process of processing and protecting data in the virtual environment will be described with reference to FIG. 3.

The virtualization driving unit 420 in the data protection apparatus 40 constructs the virtual environment 440 which supports execution of an application program included in the application program layer 30 in step S501. Here, the virtual environment 440 is constructed to have the virtual data storage unit 445.

As mentioned above, the virtual data storage unit 445 may be accessed by a process driven within the virtual environment 440, namely, the process is generated by the application program 441, but cannot be accessed by a process driven outside the virtual environment 440. Further, as the virtual data storage unit 445, at least one of a virtual image file existing in a local disk included in the hardware layer 10 of the computer 1, an external storage device connected to the computer 1, a file server connected to the computer 1 through a network, a web hard accessible by the computer 1, and an FTP host accessible by the computer 1 may be used, as described above.

In addition, the virtualization driving unit 420 generates a virtualization component 443 in the virtual environment 440 in order to support execution of the application program 441 within the virtualization environment.

Next, the process monitoring unit 410 monitors generation of a process by execution of an application program in the application program layer 30 in step S503.

Further, the process monitoring unit 410 or the virtualization driving unit 420 compares identification information of the process generated by execution of the application program and preset identification information. When the identification information of the currently generated process is identical to the preset identification information, the process monitoring unit 410 determines the corresponding process as a target to be monitored in step S505. That is, identification information of a process or an application program desired to be blocked for a data leakage thereof is set and stored in advance, and the preset identification information and that of a generated process are compared to determine whether or not the corresponding process is eligible to access the virtual environment.

Herein, when the process is determined to correspond with the preset condition, i.e., when the current process is determined to be allowed to access the virtual environment 440, the virtualization driving unit 420 drives the application program 441 within the virtual environment 440 in step S507.

Thereafter, the virtualization driving unit 420 determines whether or not a data input request or output request is generated by the process of the application program 441 driven in the virtual environment 440 in step S509. Then, the data processing unit 430 processes an input request or an output request required for internal security processing, among the determined data input requests or output requests, within the virtual environment 440. That is, the data processing unit 430 processes data input or output by using the virtual data storage unit 445 in the virtual environment 440, thereby performing a data protection operation to prevent the corresponding data from being leaked to the outside without permission in step S511.

Meanwhile, when the current process does not correspond with the preset condition in step S505, namely, when the process is not allowed to be driven in the virtual environment 440, the corresponding process or the corresponding application program is driven in the actual local environment in step S513.

Next, the data protection operation in step S511 mentioned above will be described in detail with reference to FIG. 4.

Figure 3:
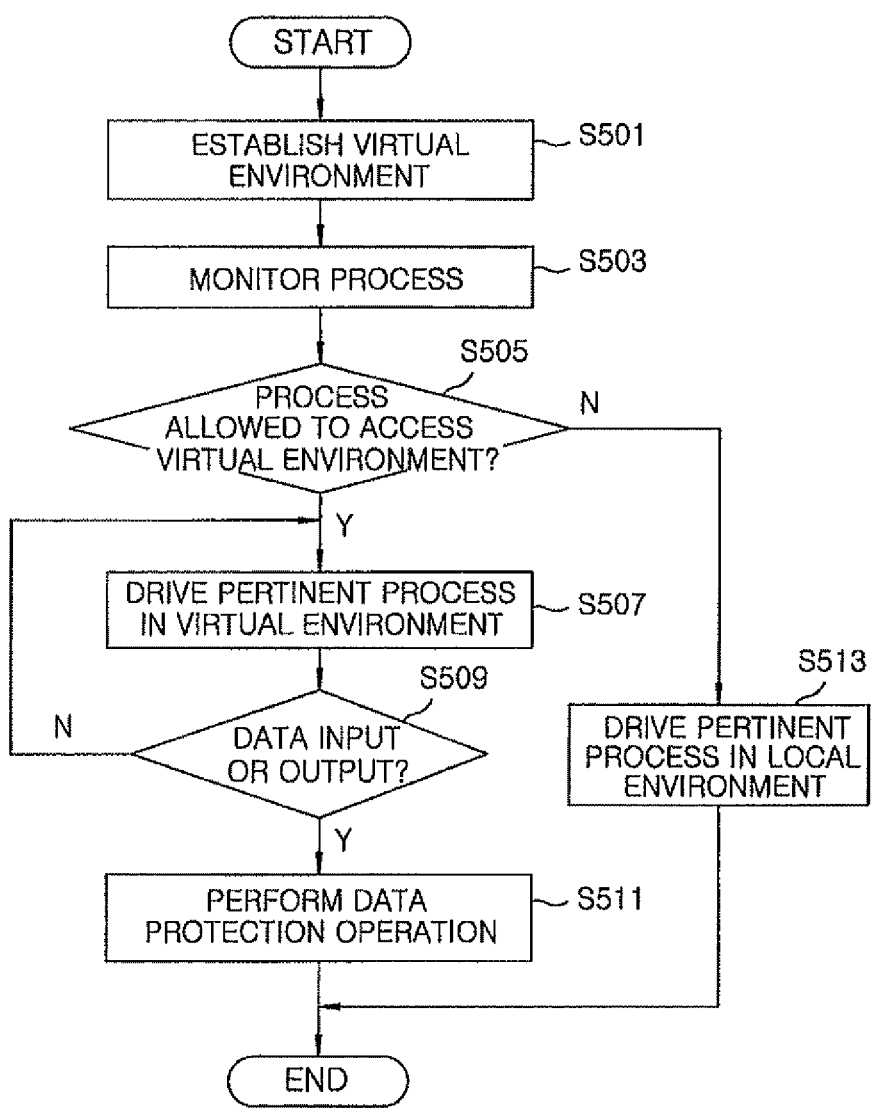
FIG. 3 is a flowchart illustrating a process of a data protection method using a virtual environment in accordance with the embodiment of the present invention.
Figure 4:
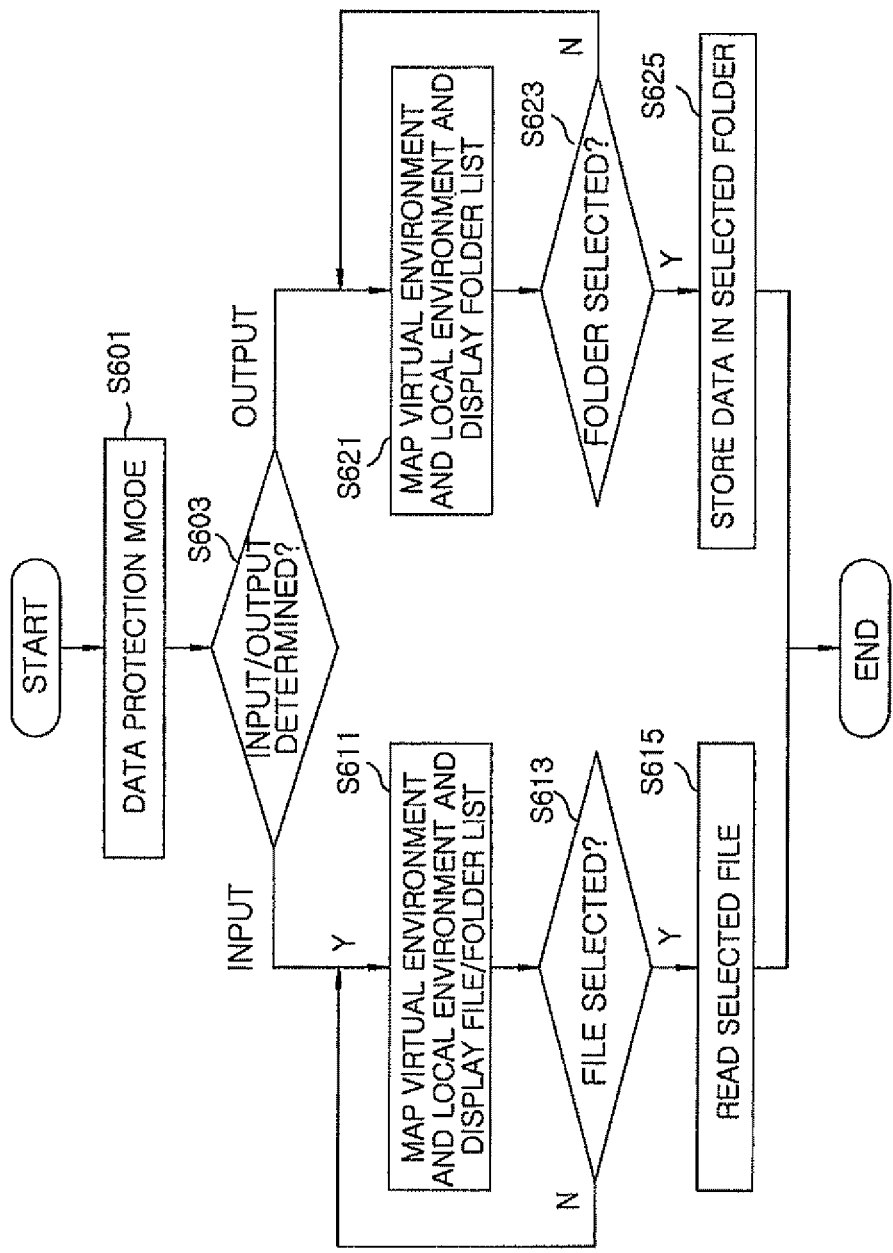
FIG. 4 is a flowchart for explaining a data protection mode based on the data protection method using a virtual environment in accordance with the embodiment of the present invention.

When the data processing unit 430 determines a data input or output request in step S509 shown in FIG. 3, the data processing unit 430 enters a data protection mode in step S601 and determines whether it is a data input request or a data output request in step S603.

Then, displaying status information of a local disk in the hardware layer 10 of the computer 1 is displayed by mapping the virtual data storage unit 445 to the local disk in steps S611 and S621. Herein, the data processing unit 430 displays the status information of the local disk by merging it with status information of the virtual data storage unit 445.

Hereinafter, in order to help understand embodiments of the present invention, a case where a user who is an employee of a company as a product designer uses a design creation program as an application program of the application program layer 30 will be described as an example. When it is assumed that the corresponding design creation program is an application program allowed to access the virtual environment 440 based on the preset condition, the corresponding design creation program is driven within the virtual environment 440. While the design creation program 441 driven in the virtual environment 440 is being executed, e.g., if the user requires storage of a file in a local storage medium such as a hard disk, a portable disk or the like of a local environment, a data output request is generated from the design creation program 441. In response, the data processing unit 430 maps the virtual environment 440 and the local environment, and displays a folder list by merging the status information of the virtual data storage unit 445 and that of the local disk in step S621.

That is, although the user required a list of folders formed in the local storage medium of the local environment, but in actuality, a list of folders formed in the virtual data storage unit 445 is provided. And, when the user selects a particular folder from the folder list through a user interface of the design creation program in step S623, a function of storing the data in the selected folder is provided. In this case, the corresponding data is subjected to an encryption process based on a predefined security rule and then stored in step S625.

On the other hand, when a data input request is generated by the design creation program in step S603, i.e., when the user requests to read a file from the local storage medium such as the hard disk, the portable disk or the like in the local environment, the data processing unit 430 maps the virtual environment 440 and the local environment to display a folder and a file list in step S611. That is, although the user requests the folder and the file list stored in the local storage medium of the local environment, but in actuality, a folder and a file list stored in the virtual data storage unit 445 is provided.

Herein, the folder and file list is provided when the folder exists in the virtual data storage unit 445. That is, when a file is stored in a root directory other than a folder, a file list is provided.

When the user selects a particular file from the file list through a user interface of the design creation program in step S613, a function of reading the selected file is provided. In this case, the corresponding data is subjected to a decryption process based on the predefined security rule, and the decrypted data is read in step S615.

In this manner, in the data protection mode, the data processing unit 430 performs inputting and outputting only within the virtual environment 440. At this time, the user recognizes that he/she uses the local storage medium of the local environment as if he uses the computer 1 in the general local environment; however, the user actually uses the virtual data storage unit 445 in the virtual environment 440. Thus, data is fundamentally prevented from being leaked to the outside of the computer 1 without permission in the data protection mode.

For example, when it is set such that a search program for searching a file or a folder in the application program layer 30 is not allowed to access the virtual environment 440, a process of the search program cannot access the virtual data storage unit 445 in the virtual environment 440, and it can search only the local storage medium in the local environment. Accordingly, the user cannot leak data to the outside from the virtual data storage unit 445.

Meanwhile, the data transmission function for allowing data of the virtual environment 440 to be stored in the local disk of the local environment and the data fetch function for fetching data of the local environment to the virtual environment 440 during the data protection operation in step S511 of FIG. 3 will be described in detail.

First, when a data transmission from the virtual environment 440 to the local environment is requested by the application program 441 executed in the virtual environment 440, the data processing unit 430 displays a folder list based on status information of a local disk. Thereafter, when the user selects a particular folder from the folder list through a user interface of the application program 441, a data file is stored in the selected folder after performing an encryption process based on the predefined security rule. In this manner, since the data file stored in the local environment is encrypted, it cannot be read in the general local environment and can be read in the virtual environment in which the data file was initially generated or in a compatible virtual environment.

In addition, when the data fetch from the local environment to the virtual environment 440 is requested by the application program 441 which is allowed to access the virtual environment 440 based on the preset condition, the data processing unit 430 displays a folder and a file list based on the status information of the local disk. Thereafter, when the user selects a particular file from the file list through a user interface of the application program 441, a function for reading the selected file is provided. In this case, if the corresponding data had been encrypted, the data is subjected to a decryption process based on the predefined security rule and the decrypted data is read.

The embodiments that are within the scope of the present invention may include a computer-readable medium that stores computer-executable instructions or data structures. The computer-readable medium may be a medium which can be controlled by a computer that executes a general function or special function. Examples of the computer-readable medium may include a RAM, a ROM, an EEPROM, a CD-ROM and an optical disk, a magnetic disk and a magnetic storage device, and the like. Further, the computer-readable medium may also include any medium that can store computer-executable instructions or program codes in the form of data structures, besides the medium illustrated above.

While the invention has been shown and described with respect to the particular embodiments, it will be understood by those skilled in the art that various changes and modification may be made without departing from the scope of the invention as defined in the following claims.

What is claimed:

1. A data protection method comprising:
   constructing a virtual environment having therein resources that support execution of an application program in a computer;
   when a process generated based on the application program corresponds with a preset condition, driving the process within the virtual environment; and
   processing data within the virtual environment in response to a data input request or a data output request generated by the process,
   wherein said driving the process includes:
   monitoring generation of the process;

determining whether the process is allowed to access the virtual environment based on a result obtained by comparing the monitored process and the preset condition; and when the process is determined to be allowed to access the virtual environment, driving the process within the virtual environment, and when the process is determined not to be allowed to access the virtual environment, driving the process outside the virtual environment.

2. The method of claim 1, wherein said constructing a virtual environment includes generating a virtual data storage unit as one of the resources within the virtual environment, the virtual data storage unit being accessible by a process driven within the virtual environment but not being accessible by a process driven outside the virtual environment.

3. The method of claim 2, wherein the virtual data storage unit includes at least any one of a virtual image file existing in a local disk of the computer, an external storage device connected to the computer, a file server connected to the computer through a network, a web hard accessible by the computer, and a file transfer protocol (FTP) host accessible by the computer.

4. The method of claim 2, wherein the data processed in response to the data input request or the data output request is processed by using the virtual data storage unit.

5. The method of claim 4, wherein when status information of the local disk is displayed on a user interface of the application program, the virtual data storage unit is mapped to the local disk to display the status information of the local disk by merging the same with status information of the virtual data storage unit.

6. The method of claim 4, wherein, in response to the data output request, the data is subjected to an encryption process based on a predefined security rule and then stored in the virtual data storage unit.

7. The method of claim 4, wherein when, in response to the data input request, the data is subjected to a decryption process based on a predefined security rule and then read from the virtual data storage unit.

8. The method of claim 1, further comprising:
when there is a data transmission request for transmitting data from the virtual environment to a local environment, encrypting the data based on a predefined security rule and storing the encrypted data in a local disk of the local environment.

9. The method of claim 1, further comprising:
when there is a data fetch request for fetching data from the local environment to the virtual environment, decrypting the data based on a predefined security rule and reading decrypted data.

10. A data protection apparatus comprising:
a process monitoring unit configured to monitor a process which is generated by based on an application program in a computer;
a virtualization driving unit configured to construct a virtual environment having therein resources that support execution of the application program, and, when the process corresponds with a preset condition, driving drive the process within the virtual environment; and
a data processing unit configured to process data within the virtual environment in response to a data input request or an output request, which is generated by the process,
wherein said driving the process includes:
monitoring generation of the process;
determining whether the process is allowed to access the virtual environment based on a result obtained by comparing the monitored process and the preset condition; and
when the process is determined to be allowed to access the virtual environment, driving the process within the virtual environment, and when the process is determined not to be allowed to access the virtual environment, driving the process outside the virtual environment.

11. The apparatus of claim 10, wherein the virtualization driving unit generates a virtual data storage unit as one of the resources, which is accessible by a process driven within the virtual environment but is not accessible by a process driven outside the virtual environment, within the virtual environment.

12. The apparatus of claim 11, wherein the virtual data storage unit includes at least any one of a virtual image file existing in a local disk of the computer, an external storage device connected to the computer, a file server connected to the computer through a network, a web hard accessible by the computer, and a file transfer protocol (FTP) host accessible by the computer.

13. The apparatus of claim 11, wherein the virtualization driving unit generates a virtualization component configured to support execution of the application program in the virtual environment.

14. The apparatus of claim 11, wherein the data processing unit processes the data in response to the data input request or the data output request by using the virtual data storage unit.

15. The apparatus of claim 11, wherein when status information of the local disk is displayed on a user interface of the application program, the data processing unit maps the virtual data storage unit to the local disk to display the status information of the local disk by merging the same with status information of the virtual data storage unit.

16. The apparatus of claim 14, wherein, in response to the data output request, the data is subjected to an encryption process based on a predefined security rule and then stored in the virtual data storage unit.

17. The apparatus of claim 14, wherein, in response to the data input request, the data is subjected to a decryption process based on a predefined security rule and then read from the virtual data storage unit.

18. The apparatus of claim 10, wherein when there is a data transmission request for transmitting data from the virtual environment to a local environment, the data processing unit encrypts the data based on a predefined security rule and stores the encrypted data in a local disk of the local environment.

19. The apparatus of claim 10, wherein when there is a data fetch request for fetching data from the local environment to the virtual environment, the data processing unit decrypts the data based on a predefined security rule and reads decrypted data.

* * * * *